United States Patent
Huang (10) Patent No.: US 8,139,890 B2
(45) Date of Patent: Mar. 20, 2012

(54) SYSTEM FOR APPLYING MULTI-DIRECTION AND MULTI-SLOPE REGION DETECTION TO IMAGE EDGE ENHANCEMENT

(75) Inventor: Zheng Bin Huang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 738 days.

(21) Appl. No.: 12/318,931

(22) Filed: Jan. 13, 2009

(65) Prior Publication Data

US 2009/0180706 A1 Jul. 16, 2009

(30) Foreign Application Priority Data

Jan. 14, 2008 (TW) ................................ 97101365 A (51) Int. Cl.
*G06K 9/40* (2006.01)
(52) U.S. Cl. ........................ 382/266; 382/261; 382/195
(58) Field of Classification Search .................... None
See application file for complete search history.

(56) References Cited

U.S. PATENT DOCUMENTS

| 5,414,473 | A | 5/1995 | Hong |
| 6,094,205 | A | 7/2000 | Jaspers |
| 2003/0198399 | A1* | 10/2003 | Atkins ........................ 382/261 |
| 2004/0207881 | A1* | 10/2004 | Nomura ....................... 358/3.24 |

* cited by examiner

*Primary Examiner* — Jason M Repko
*Assistant Examiner* — Siamak Harandi
(74) *Attorney, Agent, or Firm* — Bacon & Thomas, PLLC (57) ABSTRACT

A system for applying multi-direction and multi-slope region detection to image edge enhancement is provided to perform the image edge enhancement on an image. For pixel (i) indicating i-th pixel of line of the image, a line buffer temporarily stores the pixel (i) and its neighboring pixels. A region classification device classifies the pixel (i) into a region type. A left flat pixel detector depends on the region type to search the neighboring pixels of the pixel (i) for a left flat region pixel. A right flat pixel detector depends on the region type to search the neighboring pixels of the pixel (i) for a right flat region pixel. An edge enhancer performs an edge enhancement operation on the pixel (i) and neighboring pixels when the pixel (i) is an extended region and the left and the right flat region pixels are included in the neighboring pixels.

20 Claims, 6 Drawing Sheets

SYSTEM FOR APPLYING MULTI-DIRECTION AND MULTI-SLOPE REGION DETECTION TO IMAGE EDGE ENHANCEMENT

BACKGROUND OF THE INVENTION

1. Field of the Invention

The present invention relates to the technical field of image processing and, more particularly, to a system for applying multi-direction and multi-slope region detection to image edge enhancement.

2. Description of Related Art

The operations of image edge enhancement and de-noise in image processing are regarded as the oppositely relative filter operations. Namely, if only the image edges are enhanced, the noises cannot be eliminated. Accordingly, the de-noise operation is typically performed before the edge sharpness algorithm is enhanced, so as to avoid erroneously determine the edge transient region caused by the high frequency components of the noises. Conversely, if the de-noise operation followed by the enhancement operation is performed, the algorithm selected for the de-noise operation can indirectly affect the enhancement effect.

Figure 1:
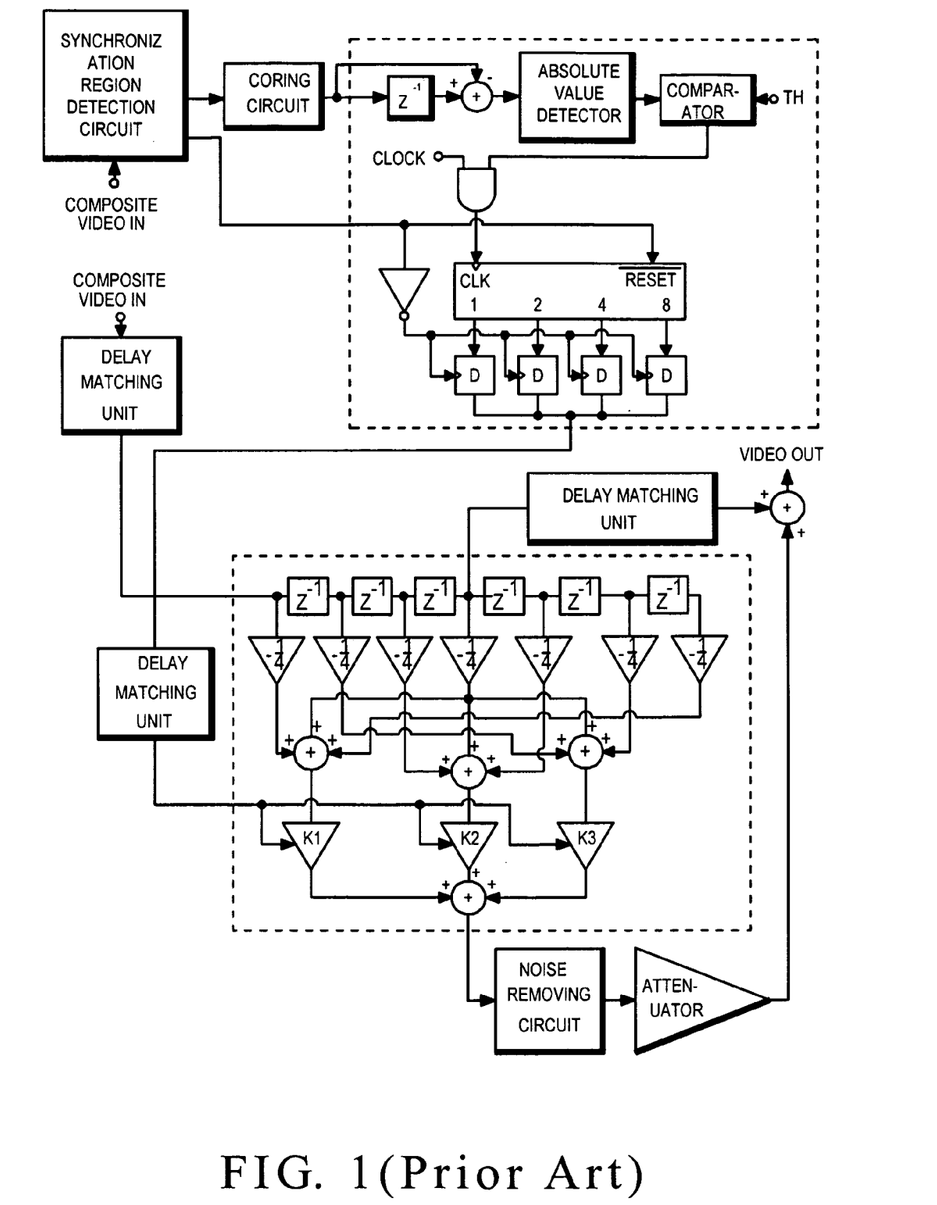
FIG. 1 is a block diagram of a typical system for edge enhancement.

The edge enhancement algorithm in the prior art typically uses multiple filters to separate corresponding band regions. However, an obtained output signal requires combining a plurality of determinations and setting the weighting parameters to thereby reach to the desired image quality. As shown in FIG. 1, U.S. Pat. No. 5,414,473 granted to Hong for an "apparatus and method for enhancing transient edge of video signal" has disclosed three filters to perform the edge enhancement in which appropriate correction of the weighting parameters is required for different image requirements. In addition, the sampling rule of the parametered digital filters is limited by the hardware configuration and cannot be modulated dynamically according to the current edge transient length. Such a way can advantage in the image enhancement to have the higher continuity, but the obtained result has a lower direct meaning, i.e., the parameters are determined after the long-running tests. Since the weighting parameters of the filters are changed with the different practical designs, they are manually adjusted as needs in the practical images corresponding to the different designs. The hardware implementation becomes heavy and complicated when the number and length of filters increases, which further increases the cost and easily skips the fine lines even the anti-aliasing is better.

Figure 2:
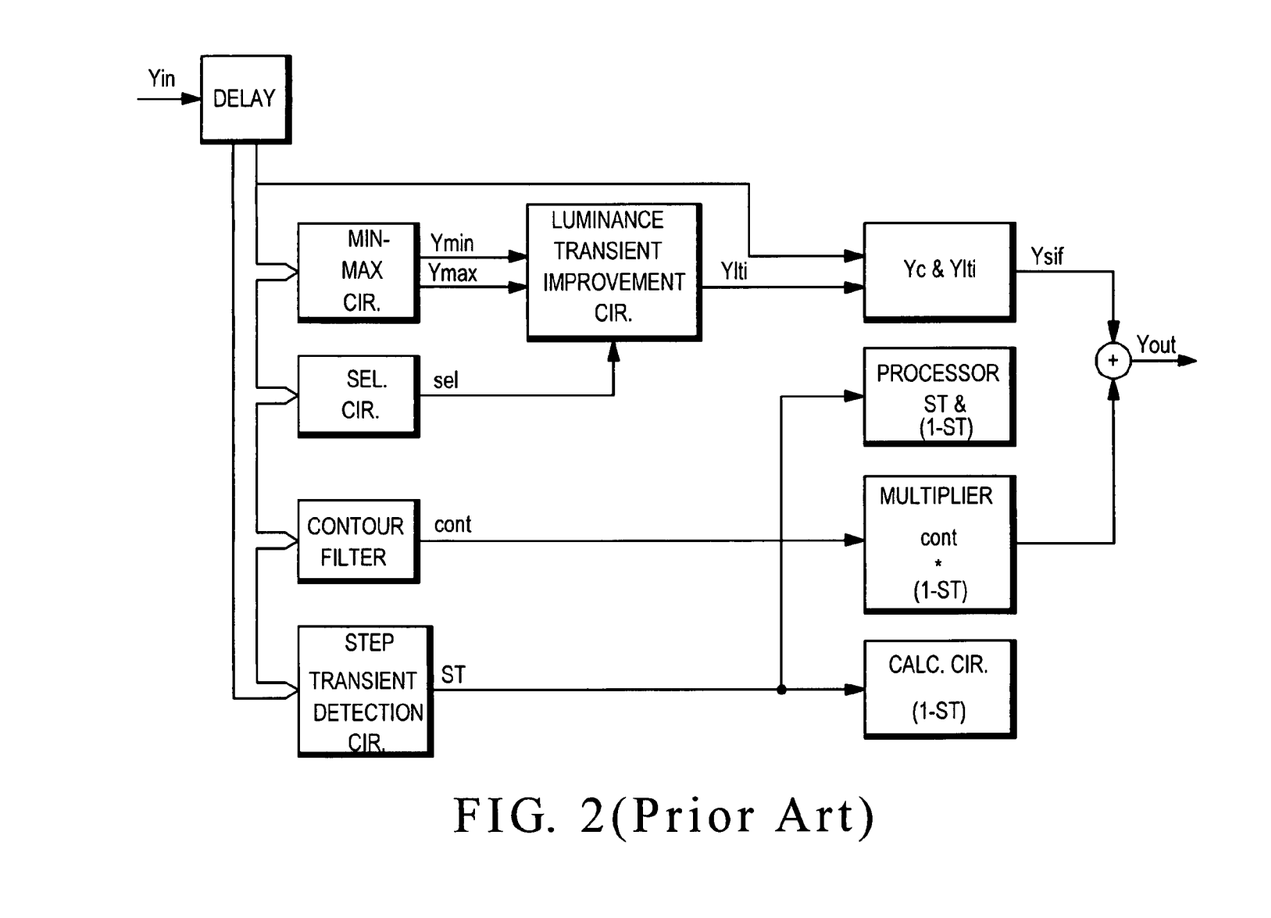
FIG. 2 is a block diagram of another typical system for edge enhancement.

U.S. Pat. No. 6,094,205 granted to Jaspers for a "Sharpness control" has disclosed the uses of second derivative to detect the edge transient regions, and the first derivative and the contour filter to adjust the gain of the edge enhancement, with the help of the maximum and minimum detection. As shown in FIG. 2, when such a method is applied in a digital signal, the cooperation of all the devices is required, which increases the hardware complexity on, for example, searching the pixels for the maximum and the minimum ones. In addition, a wrong determination appears in using the filter to find the high frequency regions (edge transient regions) for it is easily affected by the noise interference or the fine lines. Since the output of a digital filter is referred as a determinant of the gain for the edge enhancement, the sampling rule of the digital filter can be restricted by the hardware. Therefore, the image quality obtained from lower bandwidth and larger edge regions is not increased apparently. Accordingly, when the same algorithm is applied to process a lower-bandwidth image, a larger change in the prior hardware configuration is required, and the hardware requirement is relatively increased. Further, the gain adjusted by the filter can have an unexpected change due to the noise interference, especially at the enhanced edge transient regions, where the unexpectedness of luminance/chrominance/RGB changes is more serious.

Therefore, it is desirable to provide an improved system to mitigate and/or obviate the aforementioned problems.

SUMMARY OF THE INVENTION

An object of the present invention is to provide a system for applying multi-direction and multi-slope region detection to image edge enhancement, which can solve the problems of anti-aliasing insufficiency or fine line neglect produced when the filters detect the image edges in the prior art and eliminate the maximum and minimum determination on an assigned range.

Another object of the present invention is to provide a system for applying multi-direction and multi-slope region detection to image edge enhancement, which can relatively reduce the artificial image defects and appropriately remain the fine lines on the edge sharpness.

According to a feature of the invention, a system for applying multi-direction and multi-slope region detection to image edge enhancement is provided, which performs the image edge enhancement on an image comprised of multiple lines, wherein pixel (i) indicates an i-th pixel of a line of the image. The system includes a line buffer, a region classification device, a left flat pixel detector, a right flat pixel detector and an edge enhancer. The line buffer receives and temporarily stores the pixel (i) and neighboring pixels of the image. The region classification device is connected to the line buffer in order to classify the pixel (i) into a region type, wherein the region type is one selected from a group consisting of a left flat region, a right flat region, a flat region, a short flat region, an extended region and a hill region. The left flat pixel detector is connected to the region classification device to search the neighboring pixels of the pixel (i) for a left flat region pixel. The right flat pixel detector is connected to the region classification device to search the neighboring pixels of the pixel (i) for a right flat region pixel. The edge enhancer is connected to the line buffer, the region classification device, the left flat pixel detector and the right flat pixel detector to perform an edge enhancement on the pixel (i) based on the left and right flat region pixels when the pixel (i) is of the extended region as well as the left and the right flat region pixels are included in the neighboring pixels.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
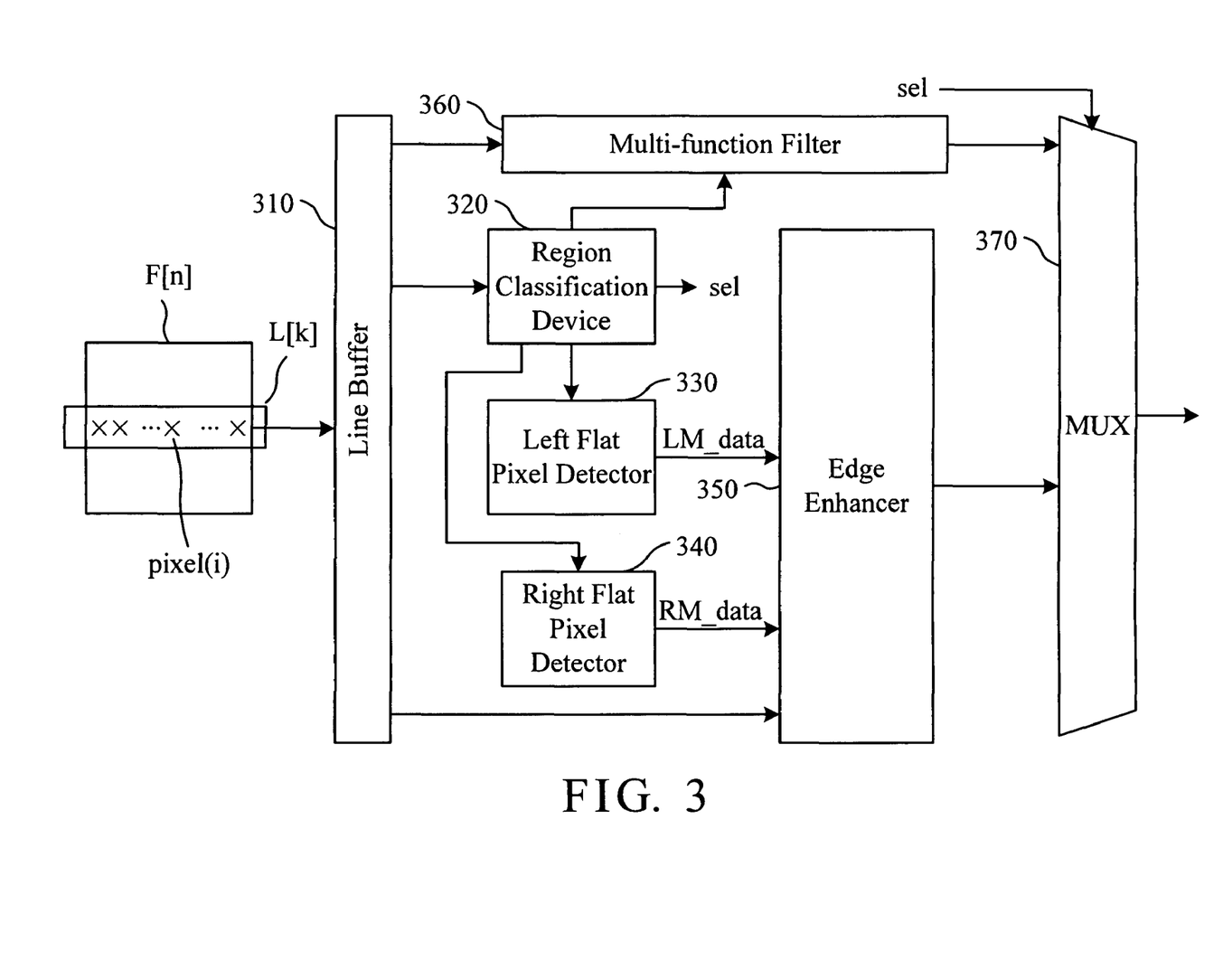
FIG. 3 is a block diagram of a system for applying multi-direction and multi-slope region detection to image edge enhancement according to the invention.

FIG. 3 is a block diagram of a system for applying multi-direction and multi-slope region detection to image edge enhancement according to the invention. The system performs an image enhancement on an image F[n] comprised of multiple lines, where pixel (i) indicates an i-th pixel of a line L(K). In FIG. 3, the system includes a line buffer 310, a region classification device 320, a left flat pixel detector 330, a right flat pixel detector 340, an edge enhancer 350, a multi-function filter 360 and a multiplexer 370.

As shown in FIG. 3, the line buffer 310 receives and temporarily stores the pixel (i) and neighboring pixels of the image. The neighboring pixels include a first left pixel (i−1), a second left pixel (i−2), a first right pixel (i+1) and a second right pixel (i+2) in any case.

The region classification device 320 is connected to the line buffer 310 in order to classify the pixel (i) into a region type. The region type can be one selected from a group consisting of a left flat region denoted as "L_Flat", a right flat region denoted as "R_Flat", a flat region denoted as "Flat", a short flat region denoted as "S_Flat", an extended region denoted as "Extend", and a hill region denoted as "Hill".

The left flat pixel detector 340 is connected to the region classification device 320 in order to search the neighboring pixels of the pixel (i) for a left flat region pixel.

The right flat pixel detector 340 is connected to the region classification device 320 in order to search the neighboring pixels of the pixel (i) for a right flat region pixel.

The edge enhancer 350 is connected to the line buffer 310, the left flat pixel detector 330 and the right flat pixel detector 340 in order to perform an edge enhancement on the pixel (i) based on the left and right flat region (neighboring) pixels when the pixel (i) is an extended region and the left and the right flat region pixels are included in the neighboring pixels.

Figure 4:
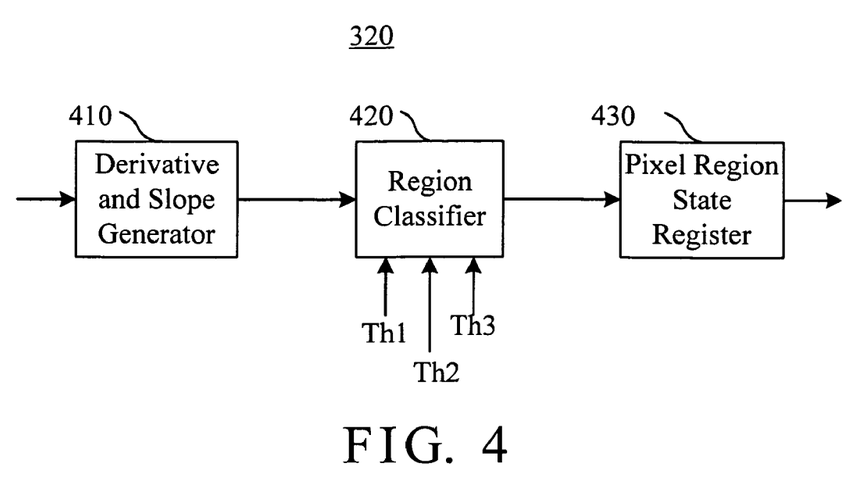
FIG. 4 is a block diagram of a region classification device according to the invention.

FIG. 4 is a block diagram of the region classification device 320 according to the invention. In FIG. 4, the device 320 includes a derivative and slope generator 410, a region classifier 420 and a pixel region state register 430.

The derivative and slope generator 410 is connected to the line buffer 310 in order to generate a derivative and a slope based on the values of the pixel and neighboring pixels. The derivative and slope generator 410 computes a right derivative R_DDX[i], a right slope R_Slope[i], a left derivative L_DDX[i], and a left slope L_Slope[i].

The right derivative R_DDX[i] is equal to Data[i]−Data[i+1], where Data[i] and Data[i+1] indicate the values of the pixel [i] and the pixel [i+1], respectively. The right slope R_Slope[i] is equal to Data[i]−Data[i+2], where Data[i] and Data[i+2] indicate the values of the pixel [i] and the pixel [i+2], respectively. The left derivative L_DDX[i] is equal to Data[i]−Data[i−1], where Data[i] and Data[i−1] indicate the values of the pixel [i] and the pixel [i−1], respectively. The left slope L_Slope[i] is equal to Data[i]−Data[i−2], where Data[i] and Data[i−2] indicate the values of the pixel [i] and the pixel [i−2], respectively.

The region classifier 420 is connected to the derivative and slope generator 410 in order to use the derivative and the slope to judge which region type the pixel (i) belongs to.

When both an absolute of the right derivative R_DDX[i] and an absolute of the left derivative L_DDX[i] are smaller than a first threshold Th1, the region classifier 420 marks the pixel (i) of the short flat region S_Flat. The first threshold Th1 can be pre-set or obtained by computing noise of the image F[n].

When an absolute of the left slope L_Slope[i] is smaller than a second threshold Th2 and the absolute of the left derivative L_DDX[i] is smaller than a third threshold Th3, the region classifier 420 marks the pixel (i) of the left flat region L_Flat. The second threshold Th2 is the first threshold Th1 plus a first constant, and the third threshold Th3 is the first threshold Th1 plus a second constant. The first constant and the second constant are varied with the bit depth of each pixel and the variance of current noise.

When an absolute of the right slope R_Slope[i] is smaller than the second threshold Th2 and the absolute of the right derivative R_DDX[i] is smaller than the third threshold Th3, the region classifier 420 marks the pixel (i) of the right flat region R_Flat.

When the pixel (i) is of the left and the right flat regions L_Flat and R_Flat simultaneously, the region classifier 420 marks the pixel (i) of the flat region Flat.

When the right and the left slopes R_Slope[i] and L_Slope[i] have different signs, the region classifier 420 marks the pixel (i) of the extended region Extend. When the right and the left slopes R_Slope[i] and L_Slope[i] have the same sign, the region classifier 420 marks the pixel (i) of the hill region Hill.

Figure 5:
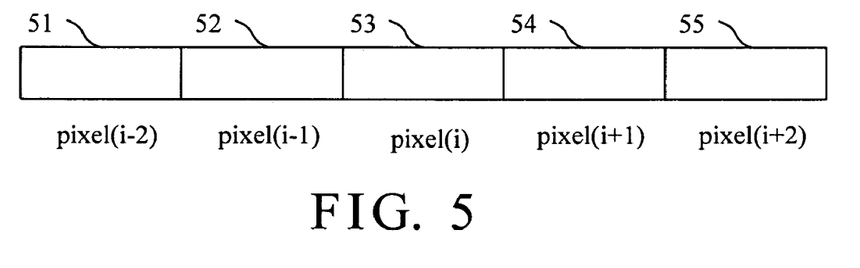
FIG. 5 is a schematic diagram of a pixel region state register according to the invention.

FIG. 5 is a schematic diagram of the pixel region state register 430. As shown in FIG. 5, the pixel region state register 430 is connected to the region classifier 420 in order to temporarily store the region types for the pixel (i) and the neighboring pixels, and comprised of multiple registers 51-55 with three bits each. The registers 51-55 temporarily store the region states of the pixels (i−2) to (i+2) marked by the region classifier 420.

When the registers 51-55 contain a value of 000b, it indicates that the corresponding pixel is the left flat region L_Flat. When the registers 51-55 contain a value of 001b, it indicates that the corresponding pixel is the right flat region R_Flat. When the registers 51-55 contain a value of 010b, it indicates that the corresponding pixel is the flat region Flat. When the registers 51-55 contain a value of 011b, it indicates that the corresponding pixel is the short flat region S_Flat. When the registers 51-55 contain a value of 100b, it indicates that the corresponding pixel is the extended region Extend. When the registers 51-55 contain a value of 101b, it indicates that the corresponding pixel is the hill region Hill.

The left flat pixel detector 330 detects one of the left neighboring pixels of the pixel (i) as a pixel of the left flat region, i.e., a left flat region pixel, and accordingly outputs the value LM_data of the left flat region pixel.

The right flat pixel detector 340 detects one of the right neighboring pixels of the pixel (i) as a pixel of the right flat region, i.e., a right flat region pixel, and accordingly outputs the value RM_data of the right flat region pixel.

Figure 6:
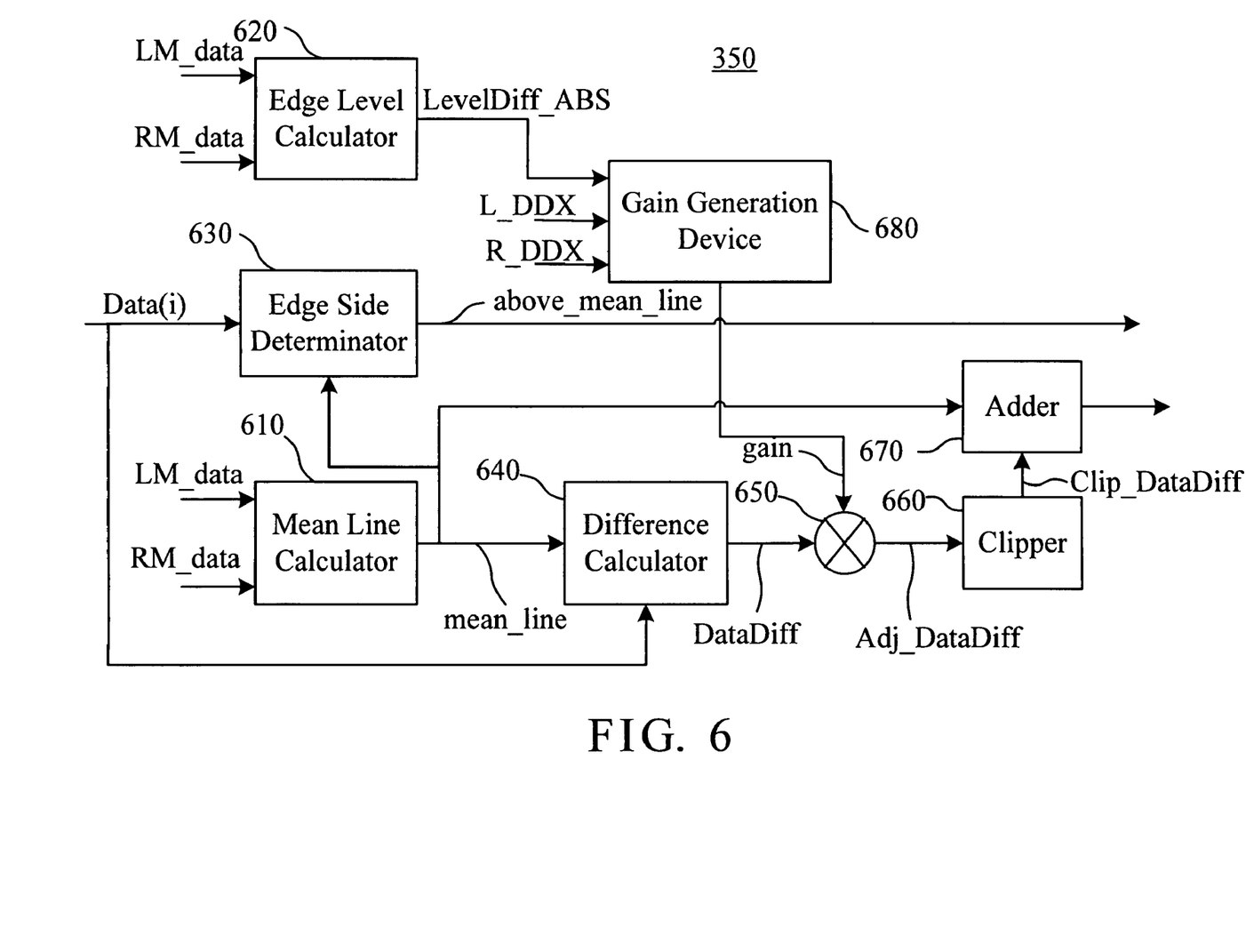
FIG. 6 is a block diagram of an edge enhancer according to the invention.

FIG. 6 is a block diagram of the edge enhancer 350 according to the invention. In FIG. 6, the edge enhancer 350 includes a mean line calculator 610, an edge level calculator 620, an edge side determinator 630, a difference calculator 640, a multiplier 650, a clipper 660, an adder 670, and a gain generation device 680.

The mean line calculator 610 is connected to the left flat pixel detector 330 and the right flat pixel detector 340 in order to generate a mean line mean_line based on the values LM_data and RM_data. The mean line mean_line is an average of the values LM_data and RM_data, i.e., adding the value of the left flat region pixel and the value of the right flat region pixel and dividing the added result by two, or mean_line=(LM_data+RM_data)/2.

The edge level calculator 620 is connected to the left flat pixel detector 330 and the right flat pixel detector 340 in order to generate an absolute level difference LevelDiff_ABS based on the values LM_data and RM_data. The absolute level difference LevelDiff_ABS is obtained by subtracting the value RM_data from the value LM_data and then performing an absolute operation on the subtracted result, i.e., LevelDiff_ABS=|LM_data−RM_data|.

The edge side determinator 630 is connected to the line buffer 110 and the mean line calculator 610 in order to determine whether the value Data[i] of the pixel (i) is greater than the mean line mean_line and output a control signal above_mean_line when the value Data[i] of the pixel (i) is greater than the mean line mean_line.

The difference calculator 640 is connected to the line buffer 110 and the mean line calculator 610 in order to compute a difference between the value of the pixel (i) and the mean line mean_line to thus generate a data difference DataDiff, i.e., DataDiff=Data(i)−mean_line.

The multiplier 650 is connected to the difference calculator 640 and the gain generation device 680 and has one input terminal to receive a gain and the other input terminal to receive the data difference DataDiff to accordingly multiply the gain by the data difference DataDiff to thus obtain an adjusted data difference Adj_DataDiff.

The clipper 660 is connected to the multiplier 650 in order to perform a clipping operation on the adjusted data difference that is over a threshold to thereby obtain a clipped data difference Clip_DataDiff.

The adder 670 is connected to the clipper 660, the edge side determinator 630 and the mean line calculator 610 in order to add the clipped data difference Clip_DataDiff and the mean line mean_line when the value Data[i] of the pixel (i) is greater than the mean line mean_line, thereby obtaining an edge enhanced pixel with respect to the pixel (i). When the value Data[i] of the pixel (i) is not greater than the mean line mean_line, the adder 670 subtracts the clipped data difference Clip_DataDiff from the mean line mean_line to thereby obtain the edge enhanced pixel.

The gain generation device 680 is connected to the edge level calculator 620 and the region classification device 320 in order to generate the gain.

Figure 7:
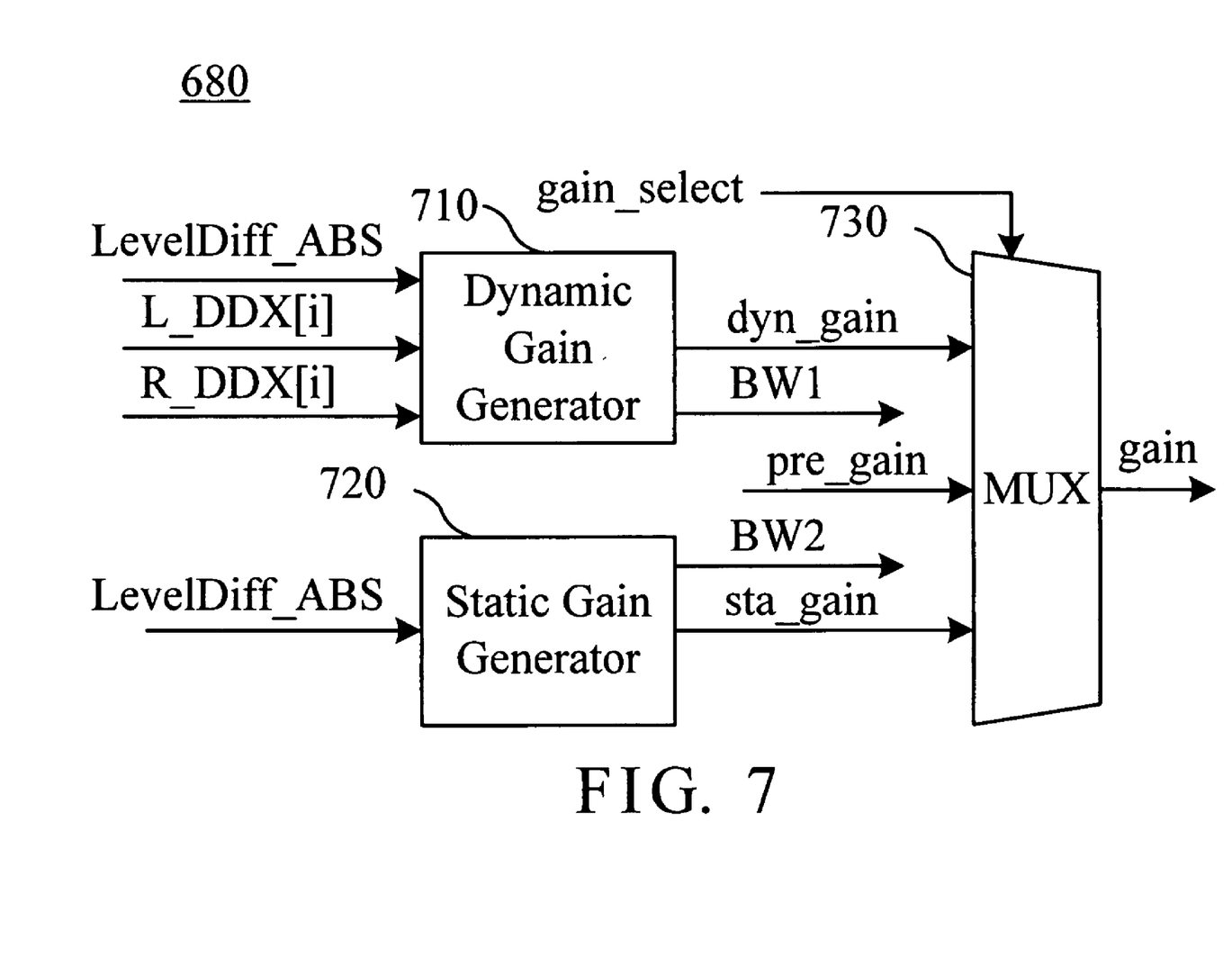
FIG. 7 is a block diagram of a gain generation device according to the invention.

FIG. 7 is a block diagram of the gain generation device 680 according to the invention. In FIG. 7, the gain generation device 680 includes a dynamic gain generator 710, a static gain generator 720 and a multiplexer 730. The dynamic gain generator 710 and the static gain generator 720 can work for bandwidth detection and automatic gain modulation.

The dynamic gain generator 710 is connected to the edge level calculator 620 and the region classification device 320 in order to generate a dynamic gain dyn_gain based on the pixel (i). The dynamic gain dyn_gain is obtained by dividing the absolute level difference LevelDiff_ABS by a dynamic slope dyn_slop. The dynamic slope dyn_slop is obtained by taking an absolute of subtracting the right derivative R_DDX[i] from the left derivative L_DDX[i], the dynamic gain dyn_gain is obtained as follows:

$$\mathrm{dyn\_gain} = \frac{\mathrm{LevelDiff\_ABS}}{\mathrm{dyn\_slop}} = \frac{\mathrm{LevelDiff\_ABS}}{|L\_DD[i] - R\_DD[i]|}.$$

The dynamic gain generator 710 can perform the bandwidth detection and accordingly output a first bandwidth value BW1. In this embodiment, the first bandwidth value BW1 is obtained by dividing the dynamic slope dyn_slop by the absolute level difference LevelDiff_ABS, i.e., $$BW1 = \frac{\mathrm{dyn\_slop}}{\mathrm{LevelDiff\_ABS}}.$$

However, in other embodiments, the first bandwidth value BW1 can be obtained by subtracting the dynamic slope dyn_slop from the absolute level difference LevelDiff_ABS, i.e., BW1=LevelDiff_ABS−dyn_slop.

The static gain generator 720 is connected to the edge level calculator 620 in order to generate a static gain sta_gain based on the absolute level difference LevelDiff_ABS. The static gain sta_gain is obtained by dividing the absolute level difference LevelDiff_ABS by a constant const, i.e., $$\mathrm{sta\_slop} = \frac{\mathrm{LevelDiff\_ABS}}{const}.$$

The static gain generator 720 can perform the bandwidth detection and accordingly output a second bandwidth value BW2. The second bandwidth value BW2 is the absolute level difference LevelDiff_ABS, i.e., BW2=LevelDiff_ABS.

The multiplexer 730 is connected to the dynamic gain generator 710 and the static gain generator 720 and has an input terminal to receive a predetermined gain pre_gain. The multiplexer 730 is based on a control signal gain_select to select the dynamic gain dyn_gain, the static gain sta_gain or the predetermined gain pre_gain as an output of the gain generation device 680.

The invention uses the gain outputted by the gain generation device 680 to adjust the data difference DataDiff to thereby achieve the purpose of image edge enhancement. Due to the dynamic gain dyn_gain generated by the dynamic gain generator 710, the features of the pixel (i) and neighboring pixels can be considered in the image edge enhancement to thus relatively reduce the artificial image defects and remain the appropriate fine lines on the edge sharpness.

On the another embodiment, the adder 670 is not connected to the edge side determinator 630 such that the value of the Clip_DataDiff signal can represent the determination mechanism of the edge side determinator 630. That is, the adder 670 need not to determine to perform an add operation or a subtraction operation.

The multi-function filter 360 is connected to the line buffer 310 and the region classification device 320 in order to perform a corresponding filtering process when the pixel (i) is of the left flat region L_Flat, the right flat region R_Flat, the flat region Flat or the short flat region S_Flat.

When the pixel (i) is of the short flat region S_Flat, the multi-function filter 360 uses a first filter to perform a filtering on the pixel (i). The first filter has a filtering factor of $$\begin{bmatrix} \frac{1}{4} & \frac{2}{4} & \frac{1}{4} \end{bmatrix}.$$

When the pixel (i) is of the left flat region L_Flat, the multi-function filter 360 uses a second filter to perform a filtering on the pixel (i). The second filter has a filtering factor of $$\begin{bmatrix} \frac{1}{4} & \frac{1}{4} & \frac{2}{4} & 0 & 0 \end{bmatrix}.$$

When the pixel (i) is of the right flat region R_Flat, the multi-function filter 360 uses a third filter to perform a filtering on the pixel (i). The third filter has a filtering factor of $$\begin{bmatrix} 0 & 0 & \frac{2}{4} & \frac{1}{4} & \frac{1}{4} \end{bmatrix}.$$

When the pixel (i) is of the flat region Flat, the multi-function filter 360 uses a fourth filter to perform a filtering on the pixel (i). The fourth filter has a filtering factor of $$\begin{bmatrix} \frac{1}{16} & \frac{3}{16} & \frac{8}{16} & \frac{3}{16} & \frac{1}{16} \end{bmatrix}.$$

As cited, the invention can solve the problems of anti-aliasing insufficiency or fine line neglect produced when the filter or filters detect the image edges in the prior art.

The invention uses the region classification device 320 to classify the pixels of the image, the multi-function filter 360 to perform a de-noise operation on the flat regions, and the edge enhancer 350 to calculate the edge center of an edge transient region and enlarge the gradient of the luminance/chrominance change of the edge center. The invention uses the identical hardware configuration to obtain the two effects of image processing, i.e., de-noise and edge sharpness increase, thereby saving the hardware cost.

The invention can reduce the manual adjusting time for the optimal parameters and further increase the transfer flexibility on different systems. The invention is different from the prior art in using the regions with gradual luminance/chrominance changes as a basis of the edge sharpness. Thus, the artificial image defects caused by the edge sharpness are relatively reduced, and the fine lines on the edge sharpness are appropriately remained.

The invention uses multi-direction and multi-slope detection to effectively detect a plurality of waveforms and accordingly computes two transient sides and a transient edge center from edge transient region. The accurate image information of the two transient sides and the transient edge center is used as a basis of adjusting the edge enhancement. Thus, the artificial image defects caused by different enhanced strength resulting from the unstable data change in the edge transient region to be enhanced is relatively avoided, and thus the quality of image output is significantly increased.

Although the present invention has been explained in relation to its preferred embodiment, it is to be understood that many other possible modifications and variations can be made without departing from the spirit and scope of the invention as hereinafter claimed.

What is claimed is:

1. A system for applying multi-direction and multi-slope region detection to image edge enhancement, which performs the image edge enhancement on image comprised of multiple lines, where pixel (i) indicates i-th pixel of line of the image, the system comprising:

a line buffer for receiving and temporarily storing the pixel (i) and neighboring pixels corresponding to the pixel (i) of the image;

a region classification device, connected to the line buffer, to classify the pixel (i) into a region type, wherein the region type is one selected from a group consisting of a left flat region, a right flat region, a flat region, a short flat region, an extended region and a hill region;

a left flat pixel detector, connected to the region classification device, to search the neighboring pixels of the pixel (i) for a left flat region pixel;

a right flat pixel detector, connected to the region classification device, to search the neighboring pixels of the pixel (i) for a right flat region pixel; and an edge enhancer, connected to the line buffer, the region classification device, the left flat pixel detector and the right flat pixel detector, to perform edge enhancement on the pixel (i) when the pixel (i) is the extended region and the left and the right flat region pixels are included in the neighboring pixels.

2. The system as claimed in claim 1, wherein the left flat pixel detector outputs a value of the left flat region pixel when one of the neighboring pixels of the pixel (i) is pixel of the left flat region, and the right flat pixel detector outputs a value of the right flat region pixel when one of the neighboring pixels of the pixel (i) is pixel of the right flat region.

3. The system as claimed in claim 2, wherein the edge enhancer comprises a mean line calculator, connected to the left flat pixel detector and the right flat pixel detector, for using the values of the left and the right flat region pixels to generate a mean line.

4. The system as claimed in claim 3, wherein the edge enhancer further comprises an edge level calculator, connected to the left flat pixel detector and the right flat pixel detector, to generate an absolute level difference by performing an absolute operation on a difference between the values of the right and the left flat region pixels.

5. The system as claimed in claim 4, wherein the edge enhancer further comprises an edge side determinator, connected to the line buffer and the mean line calculator, to determine whether a value of the pixel (i) is greater than the mean line.

6. The system as claimed in claim 5, wherein the edge enhancer further comprises a difference calculator, connected to the line buffer and the mean line calculator, to compute a difference between the value of the pixel (i) and the mean line to thus generate a data difference.

7. The system as claimed in claim 6, wherein the edge enhancer further comprises a multiplier, connected to the difference calculator and the gain generation device and having one input terminal to receive a gain and the other input terminal to receive the data difference, to thus obtain an adjusted data difference.

8. The system as claimed in claim 7, wherein the edge enhancer further comprises a clipper, connected to the multiplier, to perform clipping operation on the adjusted data difference that is over a threshold to thereby obtain a clipped data difference.

9. The system as claimed in claim 8, wherein the edge enhancer further comprises an adder, connected to the clipper, the edge side determinator and the mean line calculator, for adding the clipped data difference and the mean line when the value of the pixel (i) is greater than the mean line and conversely subtracting the clipped data difference from the mean line, thereby obtaining an edge enhanced pixel with respect to the pixel (i).

10. The system as claimed in claim 9, wherein the edge enhancer further comprises a gain generation device, connected to the edge level calculator and the region classification device, to generate the gain.

11. The system as claimed in claim 10, wherein the gain generation device comprises:
- a dynamic gain generator, connected to the edge level calculator and the region classification device, to generate a dynamic gain based on the pixel (i);
- a static gain generator, connected to the edge level calculator, to generate a static gain based on the absolute level difference; and
- a multiplexer, connected to the dynamic gain generator and the static gain generator and having an input terminal to receive a predetermined gain, for selecting the dynamic gain, the static gain or the predetermined gain as the gain.

12. The system as claimed in claim 11, wherein the dynamic gain generator performs a bandwidth detection and accordingly outputs a first bandwidth value, and the static gain generator performs a bandwidth detection and accordingly outputs a second bandwidth value.

13. A system for applying multi-direction and multi-slope region detection to image edge enhancement, which performs the image edge enhancement on image comprised of multiple lines, where pixel (i) indicates i-th pixel of line of the image, the system comprising:
- a line buffer for receiving and temporarily storing the pixel (i) and neighboring pixels corresponding to the pixel (i) of the image;
- a region classification device, connected to the line buffer, to classify the pixel (i) into a region type, wherein the region type is one selected from a group consisting of a left flat region, a right flat region, a flat region, a short flat region, an extended region and a hill region;
- a left flat pixel detector, connected to the region classification device, to search the neighboring pixels of the pixel (i) for a left flat region pixel;
- a right flat pixel detector, connected to the region classification device, to search the neighboring pixels of the pixel (i) for a right flat region pixel;
- an edge enhancer, connected to the line buffer, the region classification device, the left flat pixel detector and the right flat pixel detector, to perform edge enhancement on the pixel (i) when the pixel (i) is the extended region and the left and the right flat region pixels are included in the neighboring pixels; and
- a multi-function filter, connected to the line buffer and the region classification device, to perform filtering process when the pixel (i) is the left flat region, the right flat region, the flat region or the short flat region.

14. The system as claimed in claim 13, wherein the region classification device comprises:
- a derivative and slope generator, connected to the line buffer, to generate a derivative and a slope based on the pixel (i) and values of the neighboring pixels;
- a region classifier, connected to the derivative and slope generator, to use the derivative and the slope to determine the region type from the pixel (i); and
- a pixel region state register, connected to the region classifier, to temporarily store the region type for the pixel (i).

15. The system as claimed in claim 14, wherein the derivative and slope generator computes a right derivative R_DDX [i], a right slope R_Slope[i], a left derivative L_DDX[i] and a left slope L_Slope[i] with respect to the pixel (i).

16. The system as claimed in claim 15, wherein the right derivative R_DDX[i] is equal to a value of Data[i]−Data[i+1], the right slope R_Slope[i] is equal to a value of Data[i]−Data [i+2], the left derivative L_DDX[i] is equal to a value of Data[i]−Data[i−1] and the left slope L_Slope[i] is equal to a value of Data[i]−Data[i−2], where Data[i] indicates the value of the pixel [i], Data[i+1] indicates a value of a neighboring pixel [i+1], Data[i+2] indicates a value of a neighboring pixel [i+2], Data[i−1] indicate a value of a neighboring pixel [i−1] and Data[i−2] indicates a value of a neighboring pixel [i−2].

17. The system as claimed in claim 16, wherein the region classifier marks the pixel (i) as the short flat region when an absolute of the right derivative R_DDX[i] smaller than a first threshold and an absolute of the left derivative L_DDX[i] is smaller than the first threshold.

18. The system as claimed in claim 17, wherein the region classifier marks the pixel (i) as the left flat region when an absolute of the left slope L_Slope[i] is smaller than a second threshold and the absolute of the left derivative L_DDX[i] is smaller than a third threshold, and the region classifier marks the pixel (i) as the right flat region when an absolute of the right slope R_Slope[i] is smaller than the second threshold and the absolute of the right derivative R_DDX[i] is smaller than the third threshold.

19. The system as claimed in claim 18, wherein the region classifier marks the pixel (i) as the extended region when the right and the left slopes R_Slope[i] and L_Slope[i] have different signs, and the region classifier marks the pixel (i) as the hill region when the right and the left slopes R_Slope[i] and L_Slope[i] have the same sign.

20. The system as claimed in claim 19, wherein the region classifier marks the pixel (i) as the flat region when the pixel (i) is the left and the right flat regions L_Flat and R_Flat simultaneously.

\* \* \* \* \*